Aug. 25, 1936.    T. J. SMULSKI    2,051,912
INDICATING DEVICE
Filed Feb. 17, 1927    2 Sheets-Sheet 1
Fig.1.
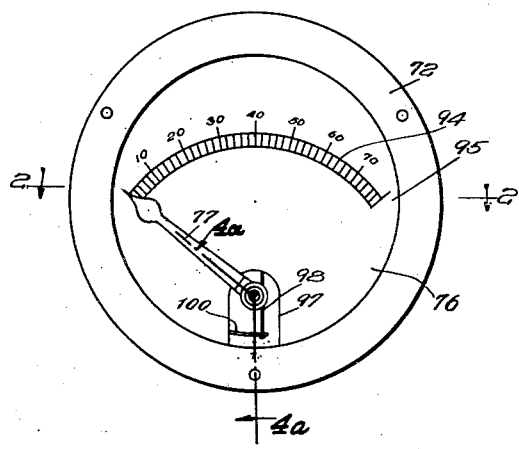
Fig.3.
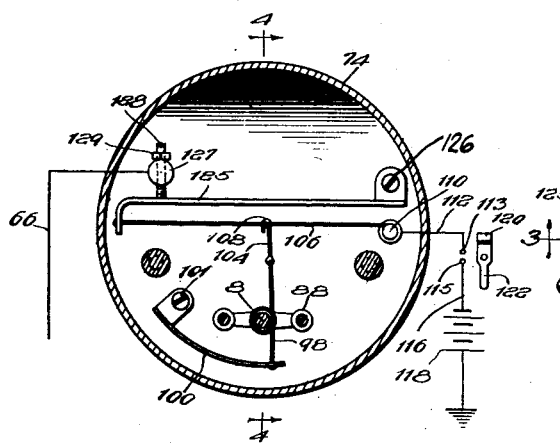
Fig.2.
Fig.4.
Fig.4a.
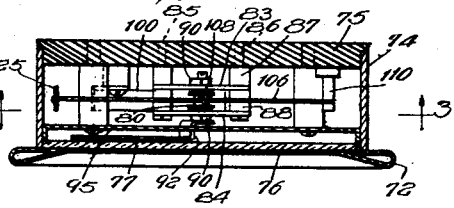
Witness:
William P. Kilroy
Inventor:
Theodore J. Smulski
Hill & Hill
Attys.

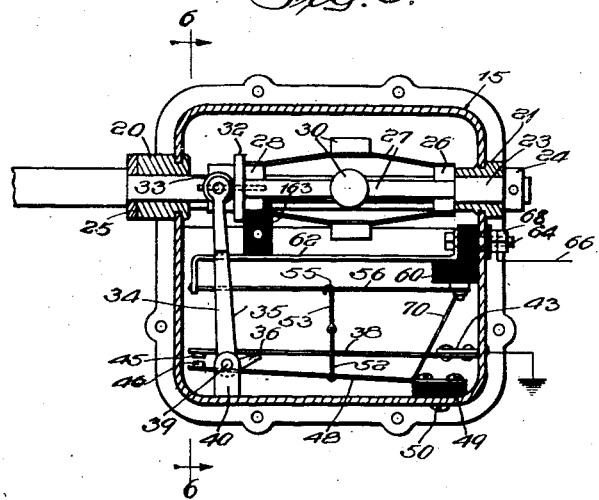

Patented Aug. 25, 1936

2,051,912

UNITED STATES PATENT OFFICE 2,051,912

INDICATING DEVICE

Theodore J. Smulski, Lake Zurich, Ill., assignor to The Anderson Co., Gary, Ind., a corporation of Indiana Application February 17, 1927, Serial No. 169,114

1 Claim. (Cl. 177—351)

My invention relates broadly to indicating devices adapted to indicate variations in physical conditions such as speed, temperature, and the like.

Apparatus embodying the present invention is caused to function by being subjected to pulsations of electrical current in such manner that it is not rendered inaccurate by variations in the voltage of the current.

A particular object of the invention is to provide an indicating device which quickly responds to changes in the condition being indicated and is adapted to indicate such changes accurately.

Many other objects and advantages of the construction herein shown and described will be obvious to those skilled in the art from the disclosure herein given.

To this end my invention consists in the novel construction, arrangement and combination of parts herein shown and described, and more particularly pointed out in the claim.

In the drawings, wherein like reference characters indicate like or corresponding parts:

Fig. 1 is a front elevation of an instrument embodying one form of the invention;

Fig. 2 is a section taken on line 2—2 of Fig. 1;

Fig. 3 is a section taken on line 3—3 of Fig. 2;

Fig. 4 is a section taken on line 4—4 of Fig. 3;

Fig. 4a is an enlarged fragmentary section taken substantially on line 4a—4a of Fig. 1;

Fig. 5 is a longitudinal section taken through an instrument which embodies the invention and is adapted to be operatively connected with the instrument illustrated in Figs. 1 to 4, inclusive;

Fig. 6 is a section taken on line 6—6 of Fig. 5;

Fig. 7 is a section taken through an instrument which embodies another form of the invention and is particularly adapted to be employed in place of the instrument illustrated in Figs. 1 to 4, inclusive; and Fig. 8 is a longitudinal section taken through an instrument which embodies still another form of the invention and is particularly adapted to be used in place of the instrument illustrated in Figs. 5 and 6.

The present invention has a wide application but I prefer to disclose it in connection with apparatus which constitutes a speedometer adapted to be used upon an automobile, or the equivalent, to indicate the speed at which it travels. However, it will become apparent as this description progresses that the invention is limited to such use only to the extent indicated in the appended claim.

Referring now to Figs. 5 and 6, wherein I have shown an instrument embodying one form of the invention, the reference character 15 designates generally a housing comprising members 16 and 17 which are secured to each other by screws 18, or the equivalent. Rotatably journaled in bearing members 20 and 21 secured to the housing member 17 is a shaft 23 which is held against longitudinal displacement by a plurality of collars 24 and 25. The shaft 23 may be of any suitable size but is preferably constructed so that it may be operatively connected to a front wheel of an automobile in such manner that the rotation of the wheel will be imparted thereto. Thus, in accordance with common practice, the housing 15 may be mounted upon any convenient portion of the chassis of the automobile and the shaft 23 is connected by a flexible shaft (not shown) to a pinion (not shown) meshing with a gear (not shown) constrained to rotate with the wheel. Of course, the shaft 23 may be operatively connected by any suitable means (not shown) to the propeller shaft of the automobile, if it is so desired.

Rigidly secured to the shaft 23 and disposed within the housing 15 is a collar 26 which is connected by a plurality of spring members 27 to a collar 28, the collar 28 being splined upon the shaft 23 and being movable longitudinally thereof toward or away from the collar 26. In this instance, each of the spring members 27 is provided with a weight 30 intermediate its ends, the construction being such that the shaft 23, the collars 26 and 28, the springs 27, and the weights 30 constitute a governor of a well known type.

Formed integral with the collar 28 is a flange 32 which is engageable by anti-friction rollers 33 carried upon a bifurcated end of an arm 34 forming part of a bell crank lever 35, the bell crank lever 35 being also provided with an arm 36 which is engageable with a spring member 38. The spring member 38 engages the free end of the arm 36 in such manner that it tends to rotate the bell crank lever 35 in a clockwise direction (Fig. 5) around a pin 39 which pivots the bell crank lever upon a bracket member 40 secured to the housing member 17. One end of the spring member 38 is rigidly secured by a bracket member 43 to the housing member 17 and the other end of the spring member 38 is provided with a contact point 45 engageable with a contact point 46 provided upon the free end of a spring member 48 which has its other end rigidly secured to a block 49 formed from electrical insulation. The block 49 is secured to the housing member 17 by one or more screws 50, or the equivalent.

Secured to the spring member 48 intermediate its end is one end of a silk thread 52, or the equivalent, which has its other end secured to a link 53 preferably formed of metal and preferably provided with a hook portion 55 adapted to hook over a wire 56 intermediate the ends of the wire. If so desired, the hook portion 55 may be twisted to secure it to the wire 56 so that it can not be accidentally displaced relative thereto. One end of the wire 56 is rigidly secured to a block 60 formed of electrical insulation, the other end of the wire being secured to one end of a metallic bracket member 62 which preferably functions as a leaf spring and has its other end secured to the block 60 by a bolt 64, or the equivalent. The bolt 64 is employed to rigidly secure the block 60 to the housing member 17 but is preferably insulated therefrom so that one end of an electrical conductor 66 may be secured thereto by nuts 68. Referring to Fig. 5, it will be noted that the right hand end of the wire 56 is electrically connected by a conductor 70 to the spring member 48.

As set forth above, the bracket member 62 preferably functions as a leaf spring, it being constructed in such manner that its free end tends to move upward (Fig. 5). As shown, the free end of the bracket member 62 abuts a wedge member 163 which is preferably formed from electrical insulation and is positioned between the bracket member and an inclined wall 164 formed in the member 16. A screw 165, or the equivalent, having its shank inserted through an aperture provided in the member 16 is screw-threaded into the wedge member 163 and a collar 167 secured to the screw 165 cooperates with its head to prevent longitudinal displacement of the screw. Obviously, the screw may be manipulated to raise or lower the free end of the bracket member 62.

In practice, the housing 16 is preferably mounted upon the chassis of the automobile in such manner that it is electrically connected therewith, the chassis of the automobile being employed as a ground with respect to the storage battery or other source of electrical energy provided in the automobile. To facilitate the disclosure of this invention, I have indicated diagrammatically that the right hand end of the spring member 38 is grounded, it being understood, of course, that the chassis of the automobile constitutes the ground.

Referring now to Figs. 1 to 4, inclusive, wherein I have shown an instrument which embodies the invention and is adapted to be operatively connected to the instrument shown in Figs. 5 and 6, the reference character 72 designates the instrument in general. It preferably comprises a housing 74 adapted to be mounted in the instrument board (not shown), or the equivalent, of the automobile. As shown, the housing 74 is substantially cylindrical in this instance, and its rear end is closed by a disc 75 which is preferably formed of electrical insulation, the front end of the housing 74 being closed by a glass 76 through which a pointer 77 is visible. One end of the pointer 77 is secured to a pulley or sheave 80 and the sheave is preferably journaled upon conical ends provided upon set screws 79 and 81, the set screws being screw-threaded into bars 83 and 84 which are mounted upon posts 85 and 86 projecting from the disc 75, sleeves 87 and 88 being provided upon the posts to space the bars from the disc and from each other. Lock nuts 90 are preferably provided upon the set screws so that they may be secured in adjusted positions with respect to the pulley 80. The pointer or hand 77 is preferably offset as at 92 (Fig. 2) and the free end thereof is adapted to traverse a scale 94 provided upon a dial plate 95 which is disposed intermediate the disc 75 and the glass 76. The dial plate 95 is provided with an aperture 97 through which the pointer or hand 77 projects.

Associated with the pulley 80 is a silk thread 98, or the equivalent, which has a portion intermediate its ends wrapped around the pulley in such manner that the pulley may be rotated by pulling either end of the thread. As best shown in Fig. 3, one end of the thread 98 is secured to the free end of a leaf spring 100 which has its other end rigidly secured by a screw 101 to the disc 75, the other end of the thread 98 being secured by a link 104 to a wire 106, which, in this instance, is substantially identical to the wire 56 shown in Figs. 5 and 6. The link 104 is preferably substantially identical to the aforementioned link 53 and is preferably provided with a hook portion 108 whereby it may be secured to the wire 106. The leaf spring 100 tensions the thread 98 and tends to draw it in a direction which will cause it to rotate the pulley 80 in a clockwise direction (Fig. 3) but when the apparatus is functionally inoperative, the wire 106 prevents such displacement of the thread.

One end of the wire 106 is secured to a metallic post 110 which projects from the disc 75 and is preferably connected by an electrical conductor 112 to a switch terminal 113 which is associated with a switch terminal 115, the switch terimal 115 being connected by an electrical conductor 116 to one terminal of a storage battery 118, or the equivalent, which has its other terminal grounded. It is, of course, understood that the storage battery 118 represents the storage battery, or the equivalent, usually provided in an automobile and that one terminal of the battery is grounded to the chassis of the automobile. A metallic plate 120 mounted upon and electrically insulated from a switch lever 122 is adapted to bridge the switch terminals 113 and 115 when the switch lever is brought into a proper position. In this instance, the switch lever 122 represents the ignition switch generally provided upon an automobile, the construction being such that when the ignition switch is brought into its closed position, the plate 120 will bridge the switch terminals 113 and 115. The purpose of this construction will appear hereinafter. The left hand end (Fig. 3) of the wire 106 is preferably secured to the free end of a substantially resilient bracket member 125 which has its other end rigidly secured to the disc 75 by a screw 126, or the equivalent, the construction of the bracket member being such that the free end thereof tends to move toward a post 127 which projects from the disc 75 and has a set-screw 128 screw-threaded therein, which set-screw may be manipulated to bring the free end of the bracket 125 into a plurality of adjusted positions. A nut 129 is preferably provided upon the set-screw 128 so that the set-screw may be locked in any of the adjusted positions.

When the apparatus shown in Figs. 1 to 4a inclusive, is employed in connection with the apparatus shown in Figs. 5 and 6, the conductor 66 is preferably employed to electrically connect the bolt 68 with the post 127. The device shown in Figs. 5 and 6, is preferably so constructed that when the shaft 23 is not being rotated, the contact points 45 and 46 do not engage each other. But they may be spaced a relatively short disthe same in construction as the wire 56 so that it elongates and contracts in unison with the wire 56 and to the same extent but it is readily understood that the wire 106 may differ materially from the wire 56 and that it will then elongate and contract in unison with the wire 56 but not to the same extent. However, such elongation will be proportional to the wire 56 and the scale 94 may be calibrated to have the pointer or hand 77 indicate the correct rate of speed thereon.

Referring now to Fig. 7 wherein I have shown construction embodying another form of the invention, the reference character 135 designates generally an instrument which comprises a number of parts which are substantially identical to certain parts of the instrument 72. To facilitate the disclosure, I have identified these parts by the same reference numerals in both instances, but I have added the letter "a" to the reference numerals applied to the parts which are found in the instrument 135. The instrument 135 comprises a housing 74a, the rear end of which is closed by a disc 75a. While I have not shown the means whereby the front end of the housing 74a is closed, it is to be understood that parts substantially identical to the glass 76 and the dial plates 95 are preferably employed for this purpose and that the instrument 135 comprises a pointer or hand which is substantially identical with the aforementioned pointer or hand 77 and like that pointer or hand, is constrained to rotate with a pulley. Thus, in Fig. 7, I have shown a pulley 80a which corresponds to the pulley 80 shown in Figs. 1 to 4, inclusive, the pulley 80a being adapted to be rotated by means comprising a thread 98a which has one of its ends secured to the free end of a spring 100a and has the other of its ends secured to a link 104a. The link 104a is secured to a wire 106a which may or may not be substantially identical with the wire 106. The spring 100a is secured to the disc 75a by a screw 101a and one end of the wire 108a is secured to a post 110a, the other end of the wire 106a being secured to the free end of a relatively resilient bracket member 125a which has its other end secured by a screw 126a, or the equivalent, to the disc 75a. Secured to the free end of the bracket member 125a is a block 137 formed from electrical insulation, which block 137 is engageable by a set-screw 128a mounted in a post 127a projecting from the disc 75a, the set-screw 128a being provided with a nut 129a whereby it may be locked in a plurality of adjusted positions. The set-screw 128a functions substantially in the same manner as the set-screw 128 shown in Fig. 3 to bring the free end of the bracket member 125a into a plurality of adjusted positions. One end of an electrical conductor 138 is preferably secured to the post 127a and the post is electrically connected to a winding 140 which is disposed around and electrically insulated from the wire 106a. As shown, one end of the winding 140 is connected by an electrical conductor 142 to a switch element 113a associated with a switch element 115a, the switch element 115a being connected by an electrical conductor 116a to a battery 118a, or the equivalent, which has one of its terminals grounded. A metallic plate 122a secured to a switch lever 122 is adapted to bridge the switch terminals 113a and 115a in substantially the same manner as the aforementioned switch lever 112 bridges the switch terminals 113 and 115.

The instrument shown in Fig. 7 may be employed in connection with the instrument shown in Figs. 5 and 6, the instruments being operatively connected to each other by connecting the free end of the conductor 138 with the free end of the conductor 66. However, it is unnecessary to describe the operation of the instruments when they are connected in such manner as it will be readily understood after I have described the operation of the instrument 135 when it is employed in connection with the instrument shown in Fig. 8.

In Fig. 8, I have shown an instrument 150 which is adapted to be employed in place of the instrument shown in Figs. 5 and 6 and preferably comprises a housing 151 in or upon which a plurality of parts are mounted which are substantially identical to the parts mounted in the housing 15. I have identified like parts by the same reference numerals in Figs. 5 and 8 but in Fig. 8, I have added the letter "a" after each one of these numerals. It will be noted that in the construction shown in Fig. 8, I do not provide an electrical conductor secured to the bolt 68a but that I have connected one end of the electrical conductor 138 to a winding 152 which is disposed around and electrically insulated from the wire 56a, the other end of the winding being connected by an electrical conductor 153 to the spring member 48a. The spring member 38a is mounted in substantially the same manner as the spring 38.

The operation of the apparatus shown in Figs. 7 and 8 is substantially as follows: Assuming that the instrument 135 and 150 have been positioned upon an automobile in substantially the same manner as the instruments shown in Figs. 1 to 6, inclusive, are assumed to be installed upon an automobile, it is readily apparent that when the switch elements 113a and 115a are bridged by the metallic plate 120a and the contact point 145a is engaged by the contact point 146a, an electrical current will flow as follows: From the battery 118a, through the conductor 116a, the switch element 115a, the metallic plate 120a, the switch element 113a, the conductor 142, the winding 140, the post 127a, the conductor 138, the winding 152, the conductor 153, the spring member 48a, the contact points 46a and 45a, the spring member 38a and then through ground back to the battery 118a. The heat resulting from the flow of electrical current through the windings 152 and 140 will cause the wires 106a and 56a to elongate and when the wire 56a has elongated sufficiently, it will permit the spring member 48a to disengage the contact point 46a from the contact point 45a whereupon the circuit will be opened. Of course, the wire 106a will elongate proportionately to the elongation of the wire 56a and the pointer or hand (not shown) secured to the pulley 80a will be moved into a position wherein it indicates the speed at which the vehicle is traveling. It is readily understood that when the apparatus is functioning the contact point 46a will be alternately engaged with and be disengaged from the contact point 45a and that the hand or pointer will remain substantially stationary in a position wherein it indicates the correct rate of speed, the slight vibratory motion imparted to the hand or pointer being insufficient to cause any difficulty in obtaining readings therefrom. Of course, means may be provided for damping the motion of the pointer so that it will be substantially dead beat.

Having thus described my invention, it is obvious that various immaterial modifications may tance from each other so that when the shaft 23 rotates at a relatively low speed and the collar 28 is longitudinally displaced to the right (Fig. 5), the spring member 38 will be permitted to bring its contact point 45 into engagement with the contact point 46.

The operation of the apparatus shown in Figs. 1 to 6, inclusive, is substantially as follows: Assuming that the apparatus has been mounted upon an automobile in the manner described above, it is readily understood that no electrical current will flow through the conductor 66 when the ignition switch 122 is not in its closed position. However, if the ignition switch is brought into its closed position and the automobile is put in motion, the shaft 23 will rotate and when the vehicle travels at a speed of one quarter of a mile per hour, for example, the collar 28 will be displaced sufficiently to permit the spring member 38 to bring the contact point 45 into engagement with the contact point 46 whereupon an electrical current will flow as follows: From the battery 118, through the conductor 116, the switch terminal 115, the switch element 120, the switch terminal 113, the electrical conductor 112, the post 110, the wire 106, the free end of the bracket 125, the set-screw 128, the post 127, the electrical conductor 66, the bolt 68, the bracket 62, the wire 56, the electrical conductor 70, the spring member 48, the contact point 46, the contact point 45, the spring member 38 and through ground, back to the battery 118. The electrical resistance of the wire 56 will cause the current flowing therethrough to heat it in such manner that it will elongate and the spring member 48 will be permitted to bring its contact point 46 out of engagement with the contact point 45 whereupon electrical current will cease to flow through the above described circuit. However, as soon as the circuit is opened between the contact points 45 and 46, the wire 56 will cool and contract so that the spring member 48 will be pulled into a position wherein its contact point 46 again engages the contact point 45 and the circuit is again closed. This sequence of operations is continued as long as the vehicle is in motion. As the wire 106 is substantially identical to the wire 56, it will be subjected to substantially the same amount of heat as the wire 106 and it will elongate the contract in unison with the wire 56. Each time the wire 106 elongates, the spring 100 displaces the thread 98 in such manner that the pulley 80 is angularly displaced in a clockwise direction (Fig. 1) around its axis of rotation and each time the wire 106 contracts, the wire displaces the thread 98 against the action of the spring 100 in such manner that the pulley 80 is angularly displaced in a counter clockwise direction (Fig. 1) around its axis of rotation. Of course, the pointer 77 moves in unison with the pulley 80.

Assuming now that the vehicle is traveling at a rate of five miles per hour, it is readily understood that the flange 32 will occupy a certain position with respect to the collar 26 and that it will permit the bell crank lever 35 to be held in a position wherein the spring member 38 will hold the contact point 45 in a position which is below the position in which it is shown in Fig. 5. Then when the contact point 45 is engaged by the contact point 46, current will flow through the above described circuit and a pulsation of electrical current will flow through that circuit, this pulsation will liberate sufficient heat to elongate the wire 56 so that the spring member 48 will move into a position wherein it will disengage the contact point 46 from the contact point 45. Obviously, the wire 106 will be subjected to the same amount of heat as the wire 56 and the pointer or hand 77 will be angularly displaced in a clockwise direction (Fig. 1) around its pivotal axis to bring it into a position wherein it will indicate upon the scale 94 the rate of speed at which the vehicle is traveling. Of course, the scale 94 is calibrated to read in miles per hour, or the equivalent. When the wire 56 has been subjected to a sufficient amount of heat to permit the spring 48 to disengage the contact point 46 from the contact point 45, the circuit will be opened and the wires 56 and 106 will cool, but this is accompanied by contraction of the wires and the spring member 48 again brings the contact point 46 into engagement with the contact point 45. In practice, it has been found that a substantially vibratory motion is imparted to the spring member 48 and that this is a similar movement of the pointer or hand 77. The angular distance through which the hand or pointer 77 travels because of this vibratory motion is exceeding small and does not prevent the operator of the automobile from obtaining accurate indications of the speed at which the vehicle is traveling. In fact, the vibratory motion of the hand or pointer 77 serves to show that the apparatus is functioning properly. This vibratory motion may be damped to make the instrument substantially dead beat.

If it is now assumed that the speed of the vehicle is increased, it is readily apparent that the flange 32 will be brought closer to the collar 26 and that the spring member 38 will be permitted to bring the contact point 45 to a position wherein it is below the position it was in when the vehicle was traveling at five miles per hour. Of course, the wire 56 must then be subjected to a greater amount of heat to permit it to elongate sufficiently so that the spring member 48 may bring the contact member 46 out of engagement with the contact point 45 but when the contact point 46 is so disengaged from the contact point 45, the circuit will be opened and the wire 56 will cool to again close the circuit. The wire 106, which is subjected to the same amount of heat as the wire 56 will, of course, elongate to the same extent that the wire 56 elongates and the spring 100 will be permitted to displace the thread 98 in such manner that the hand or pointer 77 will move into a position wherein it shows the rate of speed at which the vehicle is now traveling.

Of course, a decrease in the speed of the automobile will cause the flange 32 to be displaced toward the left (Fig. 5) so that the arm 36 of the bell crank lever will move the contact point 45 in a direction away from the contact point 46.

It is readily understood that the set-screw 128 may be manipulated to displace the free end of the bracket 125 so that the pointer or hand 77 may be made to register correctly with the scale divisions shown upon the dial plate 95. Thus, if it is found that because of vibration or the like, the apparatus has become inaccurate in that the pointer or hand does not indicate ten miles per hour when the vehicle is traveling at that rate of speed, the set-screw may be manipulated to bring the hand or pointer into its correct position. The apparatus may also be adjusted by manipulating the screw 165.

As set forth above, the wire 106 is substantially be made in the same without departing from the spirit of my invention; hence I do not wish to be understood as limiting myself to the exact form, construction, arrangement and combination of parts herein shown and described, or uses mentioned.

I claim:

In an electric indicating apparatus, a main frame, a pair of switch arms carrying confronting contacts, both arms being resiliently supported on the frame, an electrically heated element on the frame adapted to alter its length under thermal influence, means interconnecting an intermediate portion of said element and one of the switch arms to position said switch arm variably in correspondence with thermally effected movement of element, an actuating element rotatably and axially moveably supported on the frame, said actuating element adapted to be connected to rotary means the speed of which is to be indicated, means to axially move the actuating element to variably position it in correspondence with rotational speed variation, a bell crank element pivotally supported on the frame, one arm of which is moveable by the actuating element, and the other arm of which is adapted to move the other switch arm to variably position the confronting contacts of the switch arms, an electric indicating instrument, a current source, an electric circuit including the source, the electrically heated element, the contacts, and the indicating instrument, the contacts adapted to intermittently close the circuit to provide a plurality of current impulses whose cumulative value in a given interval corresponds to the axial position of the actuating element.

THEODORE J. SMULSKI.